(12) United States Patent
Arrechea Alcantar et al.

(10) Patent No.: US 11,346,675 B2
(45) Date of Patent: May 31, 2022

(54) SYSTEMS AND METHODS FOR ASSISTING A PHYSICALLY HANDICAPPED INDIVIDUAL OBTAIN A RIDE IN AN AUTONOMOUS VEHICLE

(71) Applicant: Ford Global Technologies, LLC, Dearborn, MI (US)

(72) Inventors: Luis Francisco Arrechea Alcantar, Tlalnepantla de Baz (MX); Javier Orion Suarez Ocampo, Alvaro Obregon (MX); Juan Pablo Lopez Manzano, Tlalnepantla de Baz (MX); Edgar Ulises Jimenez Lopez, Mexico City (MX)

(73) Assignee: Ford Global Technologies, LLC, Dearborn, MI (US)

( * ) Notice: Subject to any disclaimer, the term of this patent is extended or adjusted under 35 U.S.C. 154(b) by 415 days.

(21) Appl. No.: 16/668,487

(22) Filed: Oct. 30, 2019

(65) Prior Publication Data
US 2021/0131814 A1 May 6, 2021

(51) Int. Cl.
*G01C 21/34* (2006.01)
*G05D 1/00* (2006.01)
(Continued)

(52) U.S. Cl.
CPC ..... *G01C 21/3438* (2013.01); *G01C 21/3685* (2013.01); *G05D 1/0088* (2013.01);
(Continued)

(58) Field of Classification Search
CPC . G01C 21/3438; G01C 21/3685; G06F 16/29; G05D 1/0088; G05D 2201/0213; G08G 1/147; G09B 21/001
(Continued)

(56) References Cited

U.S. PATENT DOCUMENTS

| 9,970,779 B2 | 5/2018 | Kim et al. |
| 2003/0054794 A1* | 3/2003 | Zhang .................. H04W 88/04 455/403 |

(Continued)

FOREIGN PATENT DOCUMENTS

KR 20110011799 A 2/2011

*Primary Examiner* — Gertrude Arthur Jeanglaude
(74) *Attorney, Agent, or Firm* — Brandon Hicks; Eversheds Sutherland (US) LLP

(57) ABSTRACT

The disclosure is generally directed to systems and methods for assisting a physically handicapped individual to obtain a ride in an autonomous vehicle. In one exemplary embodiment, a physically handicapped individual can use a helper application installed in a smartphone to initiate a request for an autonomous vehicle. Upon receiving the request, the helper application determines a first set of location coordinates of the physically handicapped individual and a second set of location coordinates of an autonomous vehicle that is available to provide the ride. The helper application may use the first set and/or the second set of location coordinates to identify a parking spot for the autonomous vehicle. The smartphone then transmits to the autonomous vehicle, a first set of instructions directing the autonomous vehicle to drive to the parking spot, and a second set of instructions to the physically handicapped individual to assist in moving to the parking spot.

20 Claims, 6 Drawing Sheets

(51) Int. Cl.
 *G01C 21/36* (2006.01)
 *G09B 21/00* (2006.01)
 *G06F 16/29* (2019.01)
 *G08G 1/14* (2006.01)

(52) U.S. Cl.
 CPC ............ *G06F 16/29* (2019.01); *G08G 1/147* (2013.01); *G09B 21/001* (2013.01); *G05D 2201/0213* (2013.01)

(58) Field of Classification Search
 USPC ........................................................ 701/533
 See application file for complete search history.

(56) References Cited

U.S. PATENT DOCUMENTS

| | | | |
|---|---|---|---|
| 2017/0316533 A1* | 11/2017 | Goldman-Shenhar | ...................... G06Q 50/30 |
| 2018/0189717 A1* | 7/2018 | Cao | ...................... G06Q 10/083 |
| 2020/0074065 A1* | 3/2020 | Zhang | .................. G05D 1/0016 |
| 2020/0111370 A1* | 4/2020 | Dyer | ........................ H04W 4/38 |
| 2020/0124428 A1* | 4/2020 | Hamilton | ........ B60W 60/00253 |

\* cited by examiner

SYSTEMS AND METHODS FOR ASSISTING A PHYSICALLY HANDICAPPED INDIVIDUAL OBTAIN A RIDE IN AN AUTONOMOUS VEHICLE

FIELD OF THE DISCLOSURE

This disclosure generally relates to autonomous vehicles, and more particularly relates to systems and methods for assisting a physically handicapped individual obtain a ride in an autonomous vehicle.

BACKGROUND

Conventional ride services provided through vehicles such as taxis, shuttle buses, and limousines have been supplemented in the past few years by ride services (sometimes referred to as a transportation network company, a mobility service provider, or a ride-hailing service), such as Uber™ and Lyft™. Most of the automobiles used for providing these ride services are currently driven by human drivers. However, self-driven vehicles, often referred to as autonomous vehicles, have become the focus of a number of development efforts lately, and various ride service companies are considering the use of these vehicles for providing ride services. It is foreseeable that one or more of these ride service companies may include a fleet of vehicles that includes some vehicles driven by human drivers and other vehicles that are autonomous vehicles.

Picking up a customer in a vehicle driven by a human driver is fairly straightforward. The customer informs the driver of a pickup spot and the driver travels to the pickup spot to enable the customer to get into the vehicle. In the case of a customer who is physically handicapped (such as a customer who is visually impaired), the driver may get out of the vehicle and assist the customer to enter the vehicle. However, in the case of an autonomous vehicle, the visually impaired customer may be unable to determine a suitable parking spot for the autonomous vehicle. Furthermore, there is no human driver to assist the visually impaired customer to enter the autonomous vehicle even if a suitable parking spot were to be found.

It is therefore desirable to provide solutions that can help a physically handicapped individual utilize the services of an autonomous vehicle such as those offered by ride service operators.

BRIEF DESCRIPTION OF THE DRAWINGS

A detailed description is set forth below with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
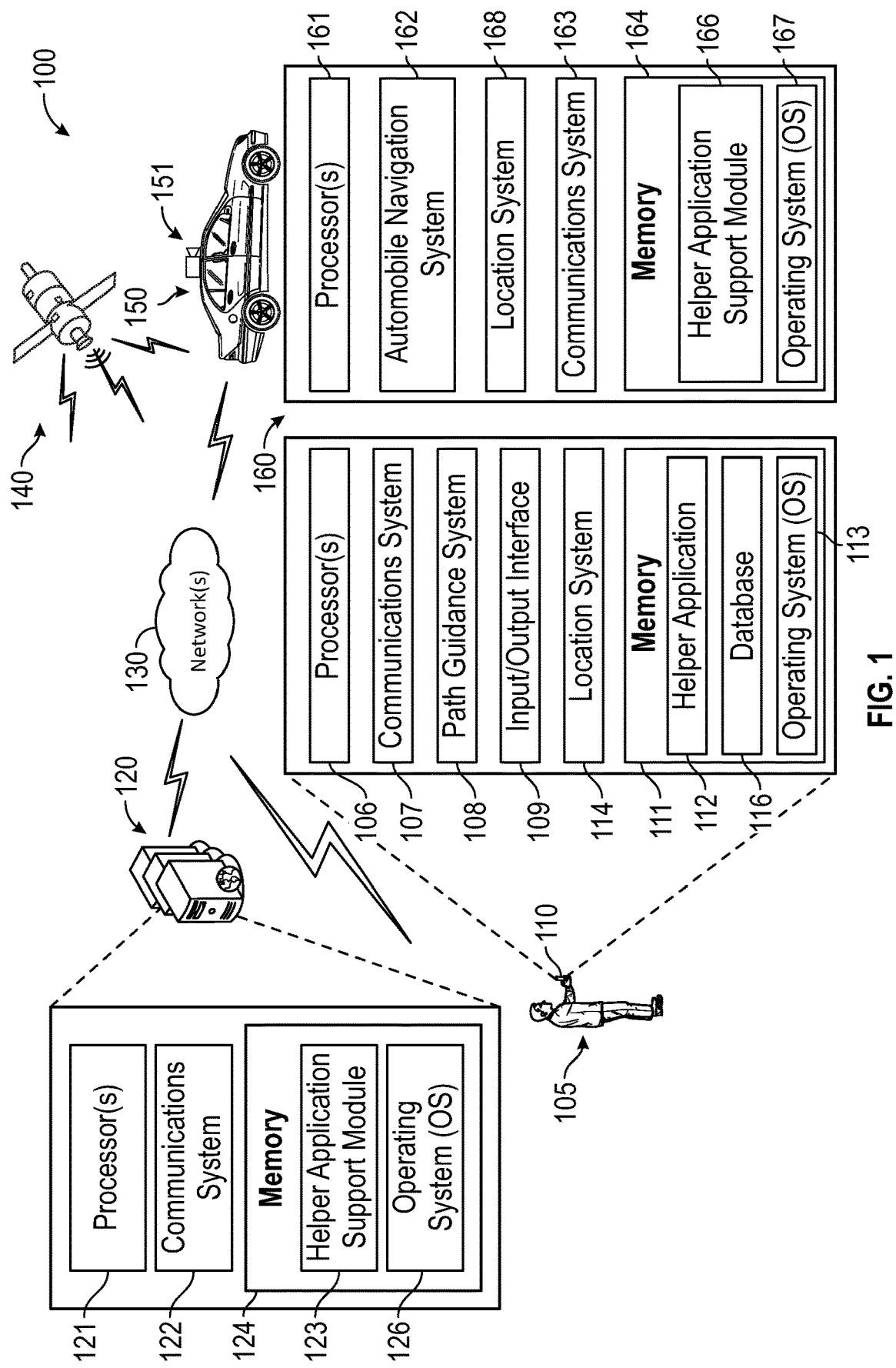
FIG. 1 shows a first exemplary embodiment of a system that includes a helper application for assisting a physically handicapped individual rendezvous and board an autonomous vehicle.

In terms of a general overview, certain embodiments described in this disclosure are directed to systems and methods for assisting a physically handicapped individual rendezvous with, and board an autonomous vehicle. In one exemplary embodiment, a helper application may be provided in a personal device such as a smartphone carried by a physically handicapped individual. The physically handicapped individual can use the helper application to request a ride in an autonomous vehicle. Upon receiving the request, the helper application determines a first set of location coordinates of the physically handicapped individual. The helper application also determines a second set of location coordinates of an autonomous vehicle that is available to provide the ride. The first set and/or the second set of location coordinates may then be utilized by the helper application to identify a third set of location coordinates corresponding to a first parking spot for the autonomous vehicle. The helper application then transmits to the autonomous vehicle, a first set of instructions directing the autonomous vehicle to drive from the second set of location coordinates to the third set of location coordinates for parking the autonomous vehicle in the first parking spot. A second set of instructions is provided by the handheld device to the physically handicapped individual, to assist the physically handicapped individual to move from the first set of location coordinates to the third set of location coordinates for rendezvousing with the autonomous vehicle at the first parking spot.

Illustrative Embodiments

The disclosure will be described more fully hereinafter with reference to the accompanying drawings, in which exemplary embodiments of the disclosure are shown. This disclosure may, however, be embodied in many different forms and should not be construed as limited to the exemplary embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described exemplary embodiments but should be defined only in accordance with the following claims and their equivalents. The description below has been presented for the purposes of illustration and is not intended to be exhaustive or to be limited to the precise form disclosed. It should be understood that alternate implementations may be used in any combination desired to form additional hybrid implementations of the present disclosure. For example, any of the functionality described with respect to a particular device or component may be performed by another device or component. Furthermore, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

Certain words and phrases are used herein solely for convenience and such words and terms should be interpreted as referring to various objects and actions that are generally understood in various forms and equivalencies by persons of ordinary skill in the art. For example, the phrase "parking spot" as used herein refers to various places where a vehicle may be parked and can include roads in urban areas as well as off-road locations (such as a hiking trail, a dirt road in a park, or an open field). The phrase "location coordinates" as used herein is not limited exclusively to GPS coordinates but may be defined in various other ways such as by an oral description containing information such as an intersection of two roads ("intersection of Central Street and $5^{th}$ Avenue") or a landmark ("in front of City Hall"). The phrase "autonomous vehicle" may be referred to alternatively in general parlance and/or in this disclosure as a "self-driven vehicle" or a "robotic vehicle." The vehicles that are referred to in this disclosure may include a wide variety of vehicles (civilian vehicles, military vehicles, etc.). Furthermore, it should be understood that the word "example" as used herein is intended to be non-exclusionary and non-limiting in nature. More particularly, the word "exemplary" as used herein indicates one among several examples, and it should be understood that no undue emphasis or preference is being directed to the particular example being described.

FIG. 1 shows a first exemplary embodiment of a system 100 that includes a helper application 112 installed in a personal device 110 for assisting a physically handicapped individual 105 rendezvous with, and board, an autonomous vehicle 150. The personal device 110 may be any handheld device such as for example, a smartphone, a tablet computer, or a wearable device, and can include various components such as a processor 106, a communications system 107, a location system 114, a path guidance system 108, an input/output interface 109, and a memory 111. The memory 111, which is one example of a non-transitory computer-readable medium, may be used to store an operating system (OS) 113, a database 116, and various code modules such as the helper application 112. Some of the code modules may be provided in the form of computer-executable instructions that can be executed by the processor 106. For example, the helper application 112 may include software that is executable by the processor 106 in cooperation with the path guidance system 108 and the communications system 107 for performing various operations to assist the physically handicapped individual 105 obtain a ride in the autonomous vehicle 150 in accordance with the disclosure. Some exemplary operations are described below using other figures.

The database 116 may be used to store various types of data/information that may be used by the processor 106 to execute various operations associated with assisting the physically handicapped individual 105 obtain a ride in the autonomous vehicle 150 in accordance with the disclosure. For example, the database 116 may include map information (such as a Google® map) and/or historical data associated with various rides and preferences of the physically handicapped individual 105.

The location system 114 may include hardware and/or software that can perform various functions such as receiving global positioning system (GPS) signals from a GPS satellite 140. The GPS signals can be used by the helper application 112 to determine location information about the personal device 110. The location information may be a set of GPS coordinates that the helper application 112 can use as an indicator to determine a location of the physically handicapped individual 105. In other implementations, the location system 114 may receive location information about the physically handicapped individual 105 in other ways. For example, location information may be provided in the form of input entered by the physically handicapped individual 105 into the personal device 110 via the input/output interface 109. The input entered by the physically handicapped individual 105 into the personal device 110 may be in various forms such as for example, a description of an intersection of two roads ("intersection of Central Street and $5^{th}$ Avenue") or a description of a nearby landmark ("in front of City Hall").

The input/output interface 109 can be one or more of various types of interfaces such as for example, a keypad (for typed input), a microphone (for audio input), a graphical user interface (GUI) (for touch-based/stylus-based input), audio components (speaker, amplifier etc., for providing audible output such as beeps/voice guidance/oral instructions), and mechanical components (such as a joystick). In some embodiments, the input/output interface 109 may be selected on the basis of one or more disabilities of the physically handicapped individual 105. For example, the input/output interface 109 may include audio components and/or a Braille keypad when the physically handicapped individual 105 is visually impaired. As another example, the input/output interface 109 may include a joystick controller when the physically handicapped individual 105 is partially paralyzed and/or seated in a wheelchair.

The helper application 112 may cooperate with the path guidance system 108 to provide to the physically handicapped individual 105, instructions to move from a current location to a new location for rendezvousing with the autonomous vehicle 150. For example, the path guidance system 108 may provide audible instructions to guide the physically handicapped individual 105 from the current location to the new location when the physically handicapped individual 105 is visually impaired.

The communications system 107 may be configured to permit the personal device 110 to communicate with various entities such as a computer 160 that is provided in the autonomous vehicle 150 and/or a server system 120. The communications may be carried out using various types of communication formats via a network 130, for example. The communication formats may include machine-to-machine communication formats and human-to-machine communication formats (voice-controlled applications, for example). The network 130 can be one or more of a wide area network (WAN), a telephone network, a cellular network, a wireless network, and/or a public network such as the Internet.

In one exemplary case, the server system 120 may include one or more computers operated by a ride services operator (not shown). The server system 120 may be operated upon by other actors in other cases. An exemplary computer of the server system 120 can include various components such as a processor 121, a communications system 122, and a memory 124. The communications system 107 may be configured to communicate with various entities such as the personal device 110 carried by the physically handicapped individual 105 and the computer 160 that is provided in the autonomous vehicle 150. The communications may be carried out in various ways, such as via the network 130 or wirelessly, and by using various types of communication formats.

The memory 124, which is another example of a non-transitory computer-readable medium, may be used to store an operating system (OS) 126 and various code modules such as a helper application support module 123. The code modules may be provided in the form of computer-executable instructions that can be executed by the processor 121. For example, the helper application support module 123 may include software that is executable by the processor 121 in cooperation with the communications system 122 for performing various operations to assist the personal device 110 execute functions associated with assisting the physically handicapped individual 105 rendezvous with the autonomous vehicle 150 in accordance with the disclosure.

In one exemplary implementation, the helper application support module 123 may use the communications system 122 and the network 130 to provide to the helper application 112 in the personal device 110, information pertaining to the autonomous vehicle 150. A few examples of the kind of information pertaining to the autonomous vehicle 150 can include location information of the autonomous vehicle 150 at various instants in time, details about the model and make of the autonomous vehicle 150 (2-door sedan, 4-door sedan, van, etc.), facilities provided in the autonomous vehicle 150 to assist physically handicapped individuals (ramp, wheel chair access, etc.), and scheduling information (time of arrival at a certain location, expected travel time, etc.).

The computer 160 that is provided in the autonomous vehicle 150 can include various components such as a processor 161, a communications system 163, an automobile navigation system 162, and a memory 164. The communications system 163 may be configured to communicate with various entities such as the personal device 110 and the server system 120 via the network 130 and/or wirelessly.

The memory 164, which is yet another example of a non-transitory computer-readable medium, may be used to store an operating system (OS) 167 and various code modules such as a helper application support module 166. The code modules may be provided in the form of computer-executable instructions that can be executed by the processor 161. For example, the helper application support module 166 may include software that is executable by the processor 161 in cooperation with the communications system 163 for performing various operations to assist the helper application 112 in the personal device 110 carry out certain functions associated with assisting the physically handicapped individual 105 obtain a ride in the autonomous vehicle 150 in accordance with the disclosure.

The location system 168 may include hardware and/or software that can perform various functions such as receiving GPS signals from the GPS satellite 140 and using the GPS signals to provide to the helper application support module 166, location information about the autonomous vehicle 150. The location information may be a set of GPS coordinates in this example implementation, which the helper application support module 166 may transfer to the helper application 112 in the personal device 110 (and/or the helper application support module 123 in the server system 120), by using the communications system 163 and the network 130.

In one exemplary implementation, the helper application support module 166 may use the communications system 163 and the network 130 to provide to the helper application 112 in the personal device 110, information pertaining to the autonomous vehicle 150. In some cases, at least some of this information may supplement, complement, or supersede information provided by the helper application support module 123 in the server system 120 to the helper application 112 in the personal device 110.

The automobile navigation system 162 may include hardware and/or software that is stored in the memory 164, for performing various functions associated with operating the autonomous vehicle 150. For example, the navigation system 162 may include software that cooperates with various types of hardware components in the autonomous vehicle 150. A few examples of such hardware may include the sensor system 151 and various components (not shown) such as a steering mechanism, an ignition switch, an accelerator, a braking mechanism, a door lock mechanism, and a GPS system. The sensor system 151 may include one or more of various components such as video cameras, motion detectors, distance sensors, proximity sensors, and audio sensors that may be used by the computer 160 to guide the autonomous vehicle 150 safely through traffic, such as a mix of vehicles and pedestrians encountered in a city.

Figure 2:
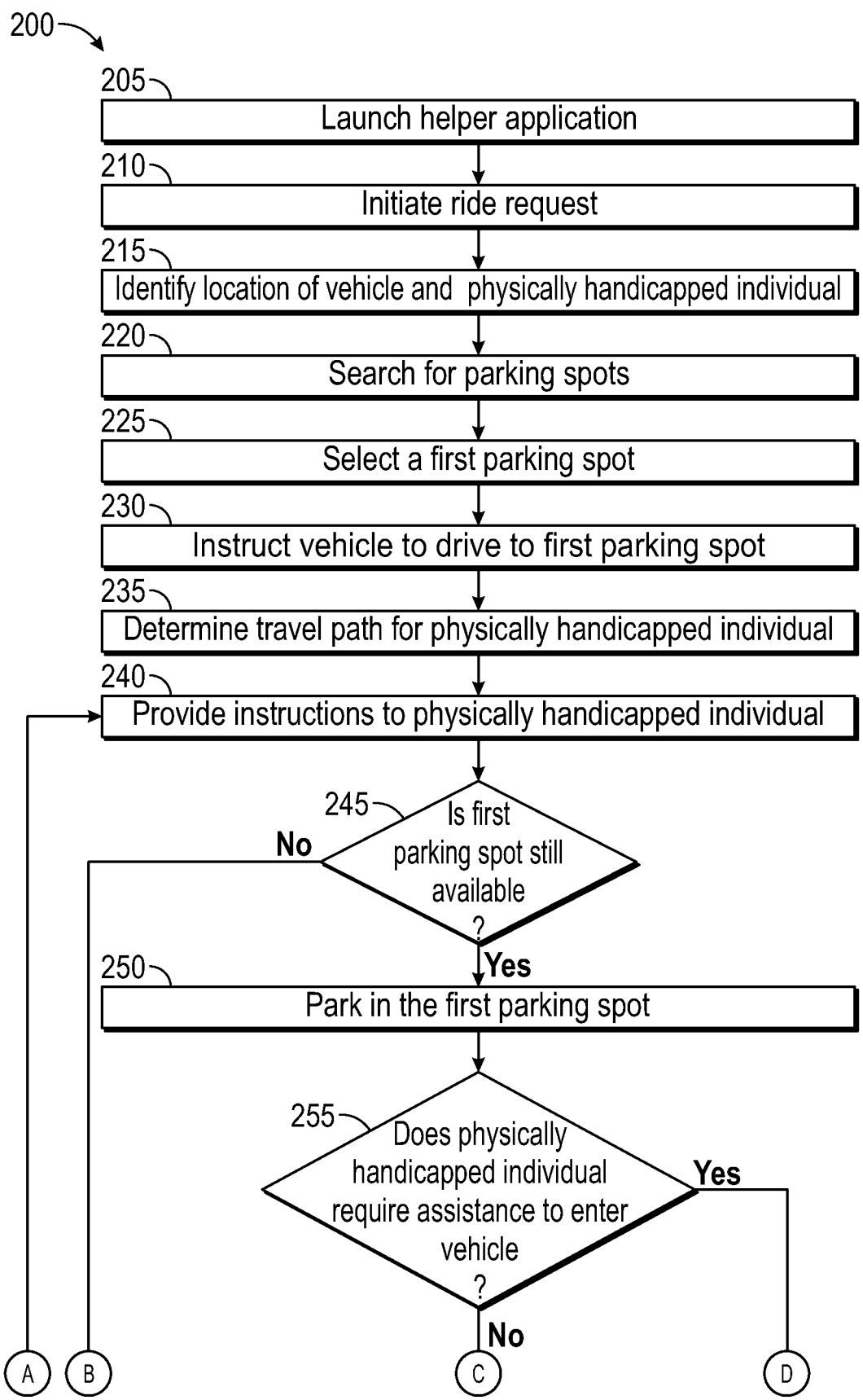
FIG. 2 shows an exemplary flowchart of a method to assist a physically handicapped individual obtain a ride in an autonomous vehicle in accordance with an embodiment of the disclosure.
Figure 2:
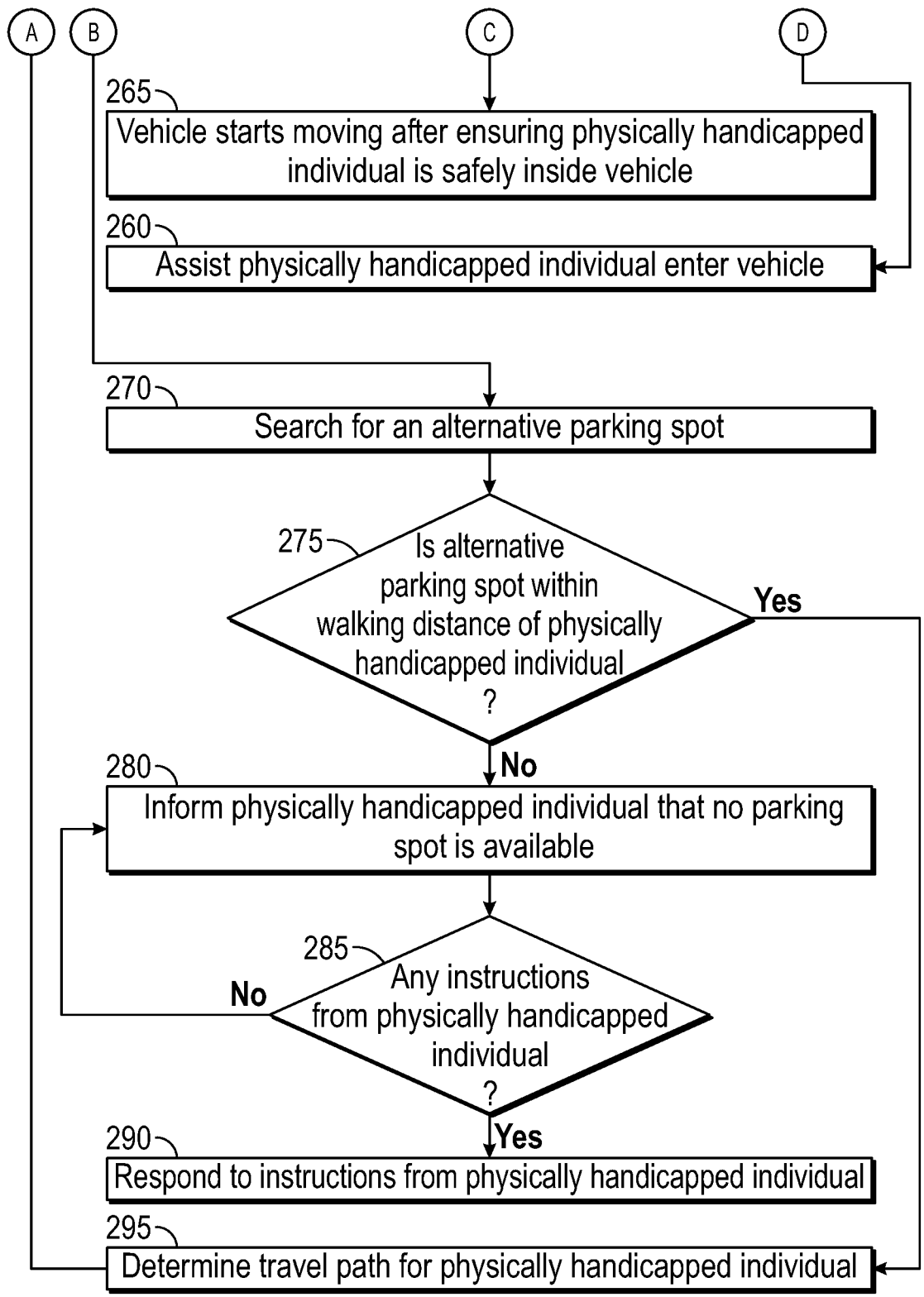

FIG. 2 shows an exemplary flowchart 200 of a method to assist the physically handicapped individual 105 obtain a ride in the autonomous vehicle 150 in accordance with an embodiment of the disclosure. The flowchart 200 illustrates an exemplary sequence of operations that can be implemented in hardware, software, or a combination thereof. In the context of software, the operations represent computer-executable instructions stored on one or more non-transitory computer-readable media, that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be carried out in a different order, omitted, combined in any order, and/or carried out in parallel. Some or all of the operations described in the flowchart 200 may be carried out by using the helper application 112 stored in the memory 111 and executed by the processor 106 of the personal device 110 in cooperation with the helper application support module 123 in the server system 120 and/or the helper application support module 166 in the computer 160 of the autonomous vehicle 150.

At block 205, the physically handicapped individual 105 may launch the helper application 112 in the personal device 110 and use the input/output interface 109 to request for help to obtain a ride in the autonomous vehicle 150. At block 210, the helper application 112 may service the request by carrying out various operations such as using the communications system 107 to communicate with the server system 120 for making a ride request to a ride services operator (not shown). The ride services operator may respond to the ride request by carrying out various actions such as selecting a vehicle that is currently located closest to the physically handicapped individual 105 and is equipped to handle the ride request. Information about the vehicle (in this example, the autonomous vehicle 150) such as assignment of the vehicle for providing the ride, and available features in the vehicle, may be communicated by the server system 120 to the personal device 110.

At block 215, the helper application 112 may determine a current location of the physically handicapped individual 105 and the autonomous vehicle 150. The current location of the physically handicapped individual 105 may be determined by the processor 106 by using the location system 114 to receive a signal from the GPS satellite 140 and process the received signal to determine a first set of location coordinates (GPS coordinates, in this example). The current location of the autonomous vehicle 150 may be determined by the processor 161 by using the location system 168 to receive a signal from the GPS satellite 140 and process the signal to determine a second set of location coordinates (GPS coordinates, in this example). The second set of location coordinates can be communicated to the helper application 112 via the communications system 163, the network 130, and the communications systems 107.

At block 220, the helper application 112 may search for one or more parking spots that are available within walking distance of the physically handicapped individual 105 when the physically handicapped individual 105 is visually impaired, or within reachable distance of the physically handicapped individual 105 when the physically handicapped individual 105 is in a wheelchair.

At block 225, the helper application 112 may select a first parking spot based on various criteria. For example, the helper application 112 may select the first parking spot after accessing the database 116 in the personal device 110 (or other databases in other locations/computers) to determine that the first parking spot is a legally permitted parking spot in accordance with applicable traffic rules and regulations. The helper application 112 may determine a third set of location coordinates that correspond to the first parking spot. In some cases, the first parking spot may be determined by using map information stored in the database 116.

At block 230, the helper application 112 may communicate with the computer 160 in the autonomous vehicle 150 (either directly via machine-to-machine communications or indirectly via the server system 120) to instruct the autonomous vehicle 150 to autonomously drive to the third set of location coordinates for parking the autonomous vehicle 150 at the first parking spot.

At block 235, the helper application 112 may utilize the database 116 to determine an optimum travel path for the physically handicapped individual 105 to move from the current location to the first parking spot.

At block 240, the path guidance system 108 may provide instructions to the physically handicapped individual 105 to move from his/her current location to the first parking spot. In one exemplary implementation, the instructions may be provided in the form of turn-by-turn audio instructions (when the physically handicapped individual 105 is visually impaired) together with warnings to avoid obstacles in the travel path.

At block 245, a determination may be made whether the first parking spot is still available when the autonomous vehicle 150 approaches the first parking spot. If the first parking spot is unoccupied and available, at block 250, the autonomous vehicle 150 stops at the first parking spot and awaits arrival of the physically handicapped individual 105.

At block 255, a determination is made whether the physically handicapped individual 105 seeks assistance to enter the autonomous vehicle 150. The determination may be made by the computer 160, based on information provided by the helper application 112 to the helper application support module 166. In an exemplary implementation, the helper application 112 may provide the information by using historical data and/or personal information stored in the database 116. In another exemplary implementation, the helper application 112 may provide the information to the computer 160 based on input provided by the physically handicapped individual 105 via the input/output interface 109. In some cases, the input may be provided in real time when the physically handicapped individual 105 approaches the autonomous vehicle 150.

At block 260, various actions can be undertaken by the autonomous vehicle 150 if the physically handicapped individual 105 seeks assistance to enter the autonomous vehicle 150. For example, the autonomous vehicle 150 may carry out maneuvers to align a passenger side entry door with a suitable spot on a curb (a wheelchair ramp, for example) and/or may emit a short beep on its horn to enable the physically handicapped individual 105 to identify the autonomous vehicle 150 and move towards the autonomous vehicle 150.

At block 265, the helper application support module 166 may communicate with various sensors in the autonomous vehicle 150 to ensure that the physically handicapped individual 105 is safely seated inside the autonomous vehicle 150 before placing the autonomous vehicle 150 in motion towards a destination specified by the physically handicapped individual 105.

If at block 245, the determination indicates that the first parking spot is no longer available when the autonomous vehicle 150 approaches the first parking spot, at block 270, the helper application 112 carries out a search for an alternative parking spot. The alternative parking spot may be selected based on various criteria. For example, the helper application 112 may select the alternative parking spot after accessing the database 116 (or other databases in other locations/computers) to determine that the alternative parking spot is a legally permitted parking spot in accordance with applicable traffic rules and regulations. The helper application 112 may then determine a fourth set of location coordinates that correspond to the alternative parking spot. In some cases, the alternative parking spot may be determined by using map information stored in the database 116.

At block 275, a determination is made whether the alternative parking spot is located within walking distance of the physically handicapped individual 105 (when the physically handicapped individual 105 is visually impaired) or within reachable distance of the physically handicapped individual 105 (when the physically handicapped individual 105 is in a wheelchair).

If the alternative parking spot is within walking distance (or within reach) of the physically handicapped individual 105, at block 295, the helper application 112 may utilize the database 116 to determine an optimum travel path for the physically handicapped individual 105 to move from the current location to the alternative parking spot. At block 240, the path guidance system 108 may provide instructions to the physically handicapped individual 105 to move from his/her current location to the alternative parking spot.

If at block 275, the determination indicates that the alternative parking spot is not within walking/reaching distance of the physically handicapped individual 105, at block 280, the helper application 112 informs the physically handicapped individual 105 that no parking spots are available within walking/reaching distance of the physically handicapped individual 105. The helper application 112 may also make a request for further instructions from the physically handicapped individual 105.

At block 285, a determination is made whether the physically handicapped individual 105 has provided further instructions. If no instructions have been received, the helper application 112 may provide additional prompts to the physically handicapped individual 105 or may abandon further activities associated with the request made by the physically handicapped individual 105 for the ride. If the physically handicapped individual 105 provides new instructions such as "wait for now and try again in 15 minutes" or "find a parking spot that is further away," at block 290, the autonomous vehicle 150 responds in accordance with the new instructions.

Figure 3:
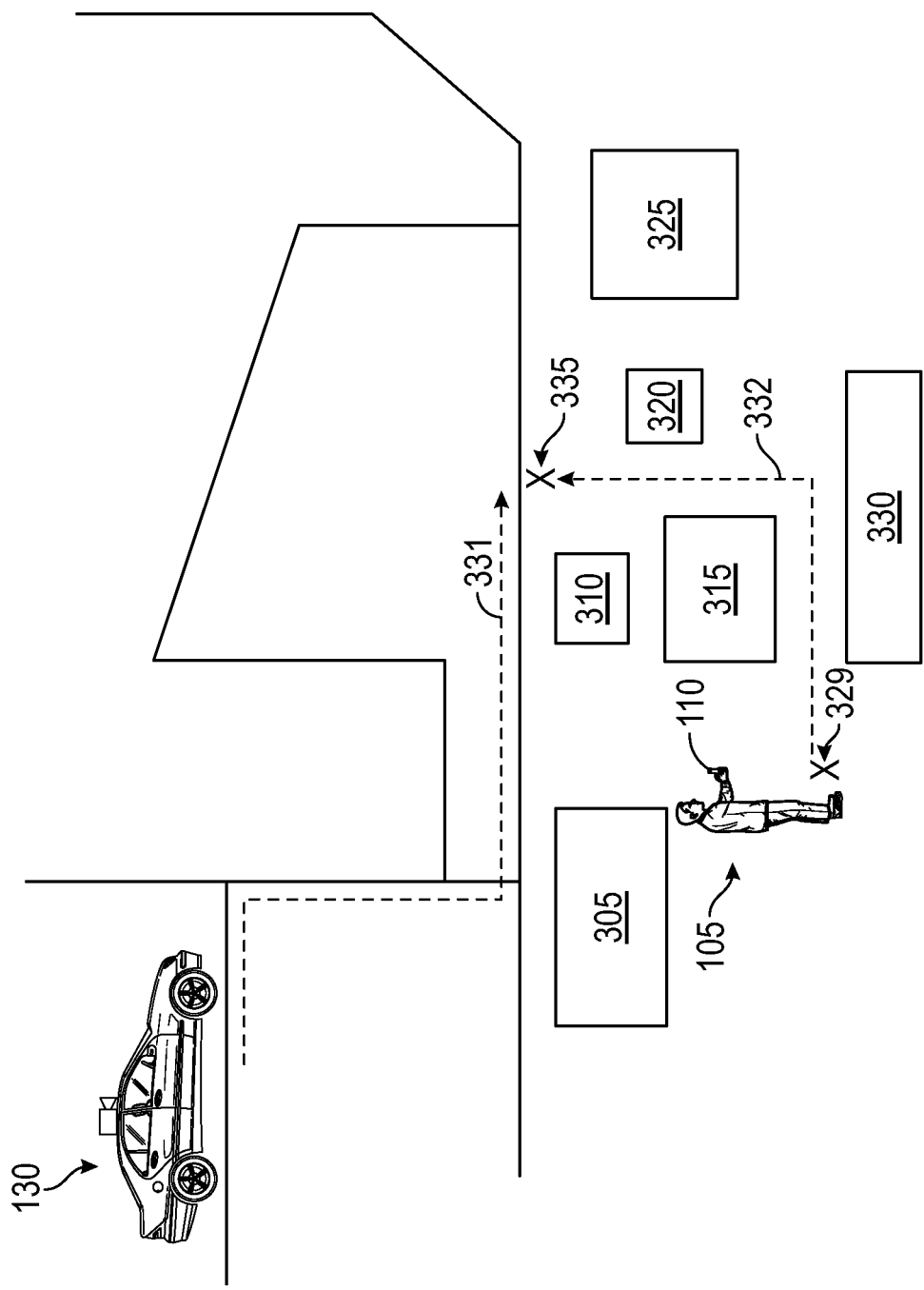
FIG. 3 illustrates a first exemplary scenario where the helper application assists a physically handicapped individual rendezvous with an autonomous vehicle at a first parking spot in accordance with an embodiment of the disclosure.

FIG. 3 illustrates a first exemplary scenario where the helper application 112 assists the physically handicapped individual 105 rendezvous with the autonomous vehicle 150 at a first parking spot 335 in accordance with an embodiment of the disclosure. This first exemplary scenario will be described by using some operations described above with respect to the flowchart 200. The physically handicapped individual 105 is located at a first location 329 when launching the helper application 112 and making the request for help to obtain a ride in the autonomous vehicle 150 (block 205). The various operations indicated in block 210 through block 225 may be carried out to identify a first parking spot 335. The helper application 112 provides instructions to the autonomous vehicle 150 to drive to the first parking spot 335 (block 230) by using a travel path 331. The helper application 112 may provide instructions to the physically handicapped individual 105 to move from the first location 329 to the first parking spot 335 (block 235, block 240) by using a travel path 332 for rendezvousing with the autonomous vehicle 150. The travel path 332 may be selected on the basis of various buildings, objects, and obstacles (such as a building 305, a building 310, a building 315, a building 330, a building 325, and a mailbox 320). In some cases, the travel path 332 may be selected on the basis of physical conditions of the physically handicapped individual 105. For example, the selection of the travel path 332 may be based in part on wheelchair friendly features (ramps, inclines etc.) when the physically handicapped individual 105 is wheelchair bound.

In a first exemplary implementation, the helper application 112 may provide instructions to the physically handicapped individual 105 at an earlier moment in time before providing instructions to the autonomous vehicle 150. The physically handicapped individual 105 may move to the first parking spot 335 and wait for the autonomous vehicle 150. The earlier moment in time may be calculated by the helper application 112 using various factors such as a distance between the first location 329 and the first parking spot 335, an estimated amount of time needed by the physically handicapped individual 105 to walk or to operate a wheelchair, to reach the first parking spot 335 ahead of time or at nearly the same time as the autonomous vehicle 150, and/or an estimated amount of time needed by the autonomous vehicle 150 to reach the first parking spot 335 (traffic route, length, congestion etc.).

In a second exemplary implementation, the helper application 112 may provide instructions to the autonomous vehicle 150 at an earlier moment in time before providing instructions to the physically handicapped individual 105. The earlier moment in time may be based on ensuring that the autonomous vehicle 150 has reached and successfully parked at the first parking spot 335 before the physically handicapped individual 105 reaches the first parking spot 335. Such a procedure may avoid making the physically handicapped individual 105 unnecessarily walk to the first parking spot 335 if the first parking spot 335 is unavailable when the autonomous vehicle 150 reaches the first parking spot 335.

In a third exemplary implementation, the helper application 112 may offer the physically handicapped individual 105 an option to wait until the helper application 112 informs the physically handicapped individual 105 that the autonomous vehicle 150 has reached, and is parked, in the first parking spot 335, before setting out towards the first parking spot 335. Such an option may eliminate the effort undertaken by the physically handicapped individual 105 to move towards the first parking spot only to find out that the autonomous vehicle 150 has been forced to find an alternative parking spot because the first parking spot 335 has been occupied by some other vehicle. When provided with such an option, the physically handicapped individual 105 may opt to wait at the first location 329 until the helper application 112 provides further instructions and/or updates.

In some cases, the helper application 112 may not only provide to the physically handicapped individual 105, turn-by-turn navigation instructions to the first parking spot 335 but may also provide status updates such as, for example, "the vehicle is waiting at the first parking spot," "the vehicle is stopped in traffic and has not yet reached the first parking spot," and "the first parking spot is no longer available."

Figure 4:
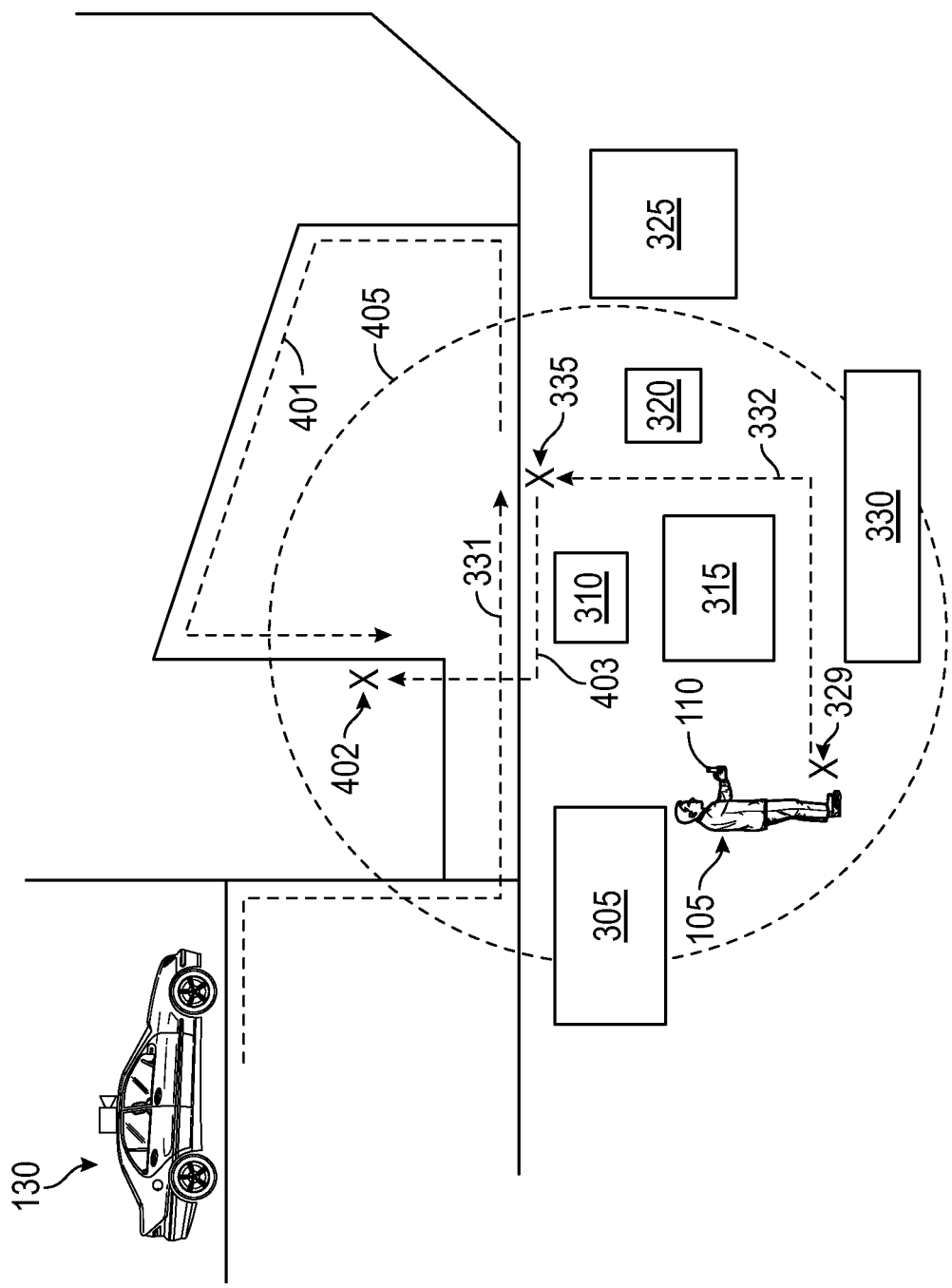
FIG. 4 illustrates a second exemplary scenario where the helper application assists a physically handicapped individual rendezvous with an autonomous vehicle at an alternative parking spot in accordance with an embodiment of the disclosure.

FIG. 4 illustrates a second exemplary scenario where the helper application 112 assists the physically handicapped individual 105 rendezvous with the autonomous vehicle 150 at an alternative parking spot 402 when the first parking spot 335 is no longer available for occupying by the autonomous vehicle 150. In one exemplary case, the first parking spot 335 may be taken up by another vehicle before the autonomous vehicle 150 reaches the first parking spot 335. The helper application support module 166 may identify the occupation of the first parking spot 335 by the other vehicle by using one or more sensors or imaging devices provided in the autonomous vehicle 150. The helper application support module 166 may inform the helper application 112 in the personal device 110 and/or the helper application support module 123 in the server system 120 that the first parking spot 335 is unavailable.

Upon receiving this information, the helper application 112 in the personal device 110 may determine an alternative parking spot 402 (as indicated in block 220 in the flowchart 200 shown in FIG. 2). One among several factors that may be used to determine the alternative parking spot 402 can include a geographical boundary 405 defined, for example, by how far the physically handicapped individual 105 can move (by foot/wheelchair) in order to reach a parking spot, or based on input provided by the physically handicapped individual 105 to the helper application 112 via the input/output interface 109.

In the second exemplary scenario shown in FIG. 4, the helper application 112 instructs the autonomous vehicle 150 to drive to the alternative parking spot 402 (block 230). In one exemplary case, the autonomous vehicle 150 may autonomously drive to the alternative parking spot 402 by using the automobile navigation system 162 and provide status updates of the drive to the helper application 112. In another exemplary case, the helper application 112 may determine a travel path 401 for the autonomous vehicle 150 to travel from the first parking spot 335 to the alternative parking spot 402. The helper application 112 may then provide information pertaining to the travel path 401 to the autonomous vehicle 150 and instruct the autonomous vehicle to follow the travel path 401.

The helper application 112 may use the path guidance system 108 to provide instructions to the physically handicapped individual 105 to move from his/her current location, which in this example, may be the first parking spot 335, to the alternative parking spot 402. The instructions may be provided in the form of turn-by-turn oral instructions (when the physically handicapped individual 105 is visually impaired) along a travel path 403. The helper application 112 may also provide audio instructions to assist the physically handicapped individual 105 across one or more roads to reach the alternative parking spot 402.

Figure 5:
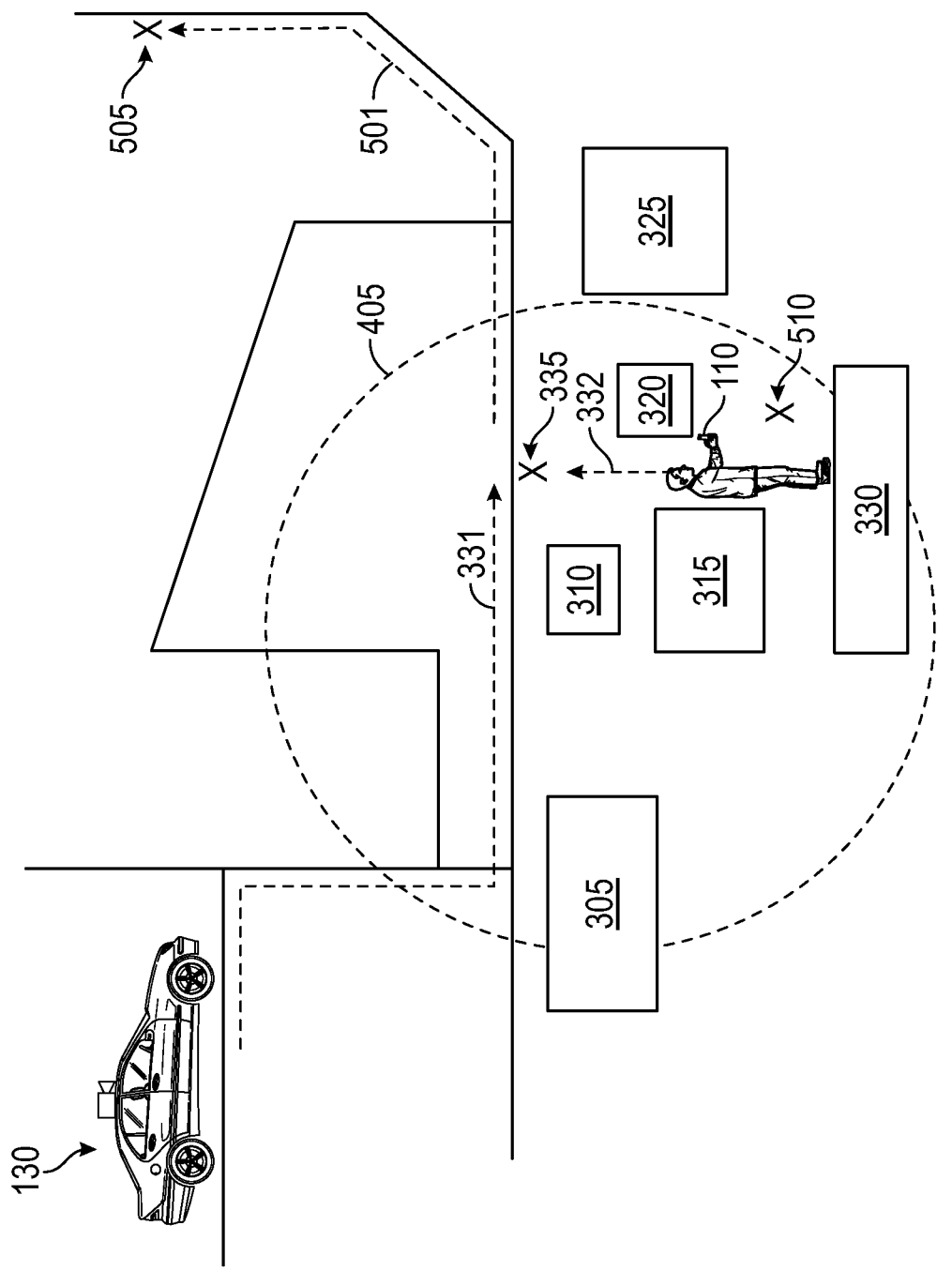
FIG. 5 illustrates a third exemplary scenario where the helper application provides a physically handicapped individual assistance to decide an option to rendezvous with an autonomous vehicle at another alternative parking spot in accordance with an embodiment of the disclosure.

FIG. 5 illustrates a third exemplary scenario where the helper application 112 offers the physically handicapped individual 105 an option to rendezvous with the autonomous vehicle 150 at another alternative parking spot 505 when the first parking spot 335 is no longer available for occupying by the autonomous vehicle 150. The helper application 112 may determine that no alternative parking spot is available within the geographical boundary 405 and that the alternative parking spot 505 is available outside the geographical boundary 405. Because the alternative parking spot 505 is located outside the geographical boundary 405, the helper application 112 may offer the physically handicapped individual 105 an option to move to the alternative parking spot 505. The option may be provided in the form of an audio message. In this example scenario, the physically handicapped individual 105 has moved along the travel path 332 and is currently located at a location 510. If the physically handicapped individual 105 decides to accept to move to the alternative parking spot 505, the helper application 112 provides turn-by-turn guidance to the physically handicapped individual 105 to move from the position 510 to the alternative parking spot 505. The helper application 112 may also instruct the autonomous vehicle 150 to follow the travel path 501 for reaching the alternative parking spot 505.

If the physically handicapped individual 105 decides not to accept moving to the alternative parking spot 505, the helper application 112 may provide further options such as waiting for a new parking spot to become available inside the geographical boundary 405 or to cancel the ride.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize one or more devices that include hardware, such as, for example, one or more processors and system memory, as discussed herein. An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, cause the processor to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

A memory device such as the memory 124, the memory 111, and the memory 164, can include any one memory element or a combination of volatile memory elements (e.g., random-access memory (RAM, such as DRAM, SRAM, SDRAM, etc.)) and non-volatile memory elements (e.g., ROM, hard drive, tape, CDROM, etc.). Moreover, the memory device may incorporate electronic, magnetic, optical, and/or other types of storage media. In the context of this document, a "non-transitory computer-readable medium" can be, for example but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random-access memory (RAM) (electronic), a read-only memory (ROM) (electronic), an erasable programmable read-only memory (EPROM, EEPROM, or Flash memory) (electronic), and a portable compact disc read-only memory (CD ROM) (optical). Note that the computer-readable medium could even be paper or another suitable medium upon which the program is printed, since the program can be electronically captured, for instance, via optical scanning of the paper or other medium, then compiled, interpreted or otherwise processed in a suitable manner if necessary, and then stored in a computer memory.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description, and claims refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method comprising:
providing, in a handheld device, a helper application;
receiving, by the helper application, from a physically handicapped individual, a request for help in obtaining a ride in an autonomous vehicle;
determining, by the helper application, a first set of location coordinates of the physically handicapped individual and a second set of location coordinates of the autonomous vehicle;
utilizing, by the helper application, at least one of the first set of location coordinates or the second set of location coordinates, to identify a third set of location coordinates that correspond to a first parking spot for the autonomous vehicle;
transmitting, by the handheld device, to the autonomous vehicle, a first set of instructions directing the autonomous vehicle to drive from the second set of location coordinates to the third set of location coordinates for parking the autonomous vehicle in the first parking spot; and
providing, by the handheld device, to the physically handicapped individual, a second set of instructions to move from the first set of location coordinates to the third set of location coordinates for rendezvousing with the autonomous vehicle at the first parking spot.

2. The method of claim 1, wherein the physically handicapped individual is a visually impaired individual who is on foot, wherein the third set of location coordinates is identified to be within walking distance of the first set of location coordinates, and wherein the second set of instructions comprises navigational guidance for the visually impaired individual to walk from the first set of location coordinates to the third set of location coordinates.

3. The method of claim 2, wherein the helper application is provided in one of a smartphone or a portable computer carried by the visually impaired individual, and wherein the second set of instructions include audible instructions conveyed to the visually impaired individual by the one of the smartphone or the portable computer.

4. The method of claim 1, wherein the physically handicapped individual is seated in a wheelchair, and wherein the second set of instructions comprises navigational guidance for the physically handicapped individual to operate the wheelchair for moving from the first set of location coordinates to the third set of location coordinates.

5. The method of claim 1, further comprising:
receiving, by the handheld device, from the autonomous vehicle, an indication that the first parking spot is unavailable;
identifying, by the helper application, a fourth set of location coordinates that correspond to an alternative parking spot for the autonomous vehicle; and
transmitting, by the handheld device, to the autonomous vehicle, a third set of instructions directing the autonomous vehicle to drive to the fourth set of location coordinates for parking the autonomous vehicle in the alternative parking spot.

6. The method of claim 5, wherein each of the first set of location coordinates, the second set of location coordinates, the third set of location coordinates, and the fourth set of location coordinates comprise global positioning system (GPS) coordinates.

7. The method of claim 6, further comprising:
ensuring, by the helper application, that the alternative parking spot is located inside a geographical boundary that encompasses the first parking spot.

8. The method of claim 5, further comprising:
determining, by the helper application, that each of the first parking spot and the alternative parking spot is a legally permitted parking spot.

9. A method comprising:
receiving, by a computer in an autonomous vehicle, from a helper application executed in a handheld device, a request to help a physically handicapped individual obtain a ride in the autonomous vehicle;
receiving, by the computer in the autonomous vehicle, from the helper application, a first set of instructions directing the autonomous vehicle to drive to a first parking spot; and
providing, by the computer in the autonomous vehicle, to the helper application in the handheld device, information to assist the helper application provide to the physically handicapped individual, a second set of instructions to assist the physically handicapped individual navigate to the first parking spot.

10. The method of claim 9, wherein the physically handicapped individual is located at a first location that is defined by a first set of location coordinates, the autonomous vehicle is located at a second location that is defined by a second set of location coordinates, and the first parking spot is defined by a third set of location coordinates.

11. The method of claim 10, wherein the physically handicapped individual is a visually impaired individual, the helper application is provided in one of a smartphone or a portable computer carried by the visually impaired individual, and the visually impaired individual is provided audible instructions by the one of the smartphone or the portable computer to assist the visually impaired individual to walk from the first location to the first parking spot.

12. The method of claim 10, wherein the physically handicapped individual is seated in a wheelchair, the helper application is provided in one of a smartphone or a portable computer carried by the physically handicapped individual, and the physically handicapped individual is provided audible instructions by the one of the smartphone or the portable computer to assist the physically handicapped individual to operate the wheelchair for moving from the first location to the first parking spot.

13. The method of claim 9, further comprising:
determining, by the computer in the autonomous vehicle, upon approaching the first parking spot that the first parking spot is unavailable;
conveying, by the computer in the autonomous vehicle, to the handheld device, an indication that the first parking spot is unavailable; and
receiving, by the computer in the autonomous vehicle, from the helper application, a second set of instructions directing the autonomous vehicle to drive to an alternative parking spot.

14. A computer system comprising:
at least one memory that stores computer-executable instructions; and
at least one processor configured to access the at least one memory and execute the computer-executable instructions to at least:
receive, from a physically handicapped individual, a request for help in rendezvousing with an autonomous vehicle;
determine a first set of location coordinates of the physically handicapped individual and a second set of location coordinates of the autonomous vehicle;
utilize at least one of the first set of location coordinates or the second set of location coordinates, to identify a third set of location coordinates that correspond to a first parking spot for the autonomous vehicle;
transmit to the autonomous vehicle, a first set of instructions directing the autonomous vehicle to drive from the second set of location coordinates to the third set of location coordinates for parking the autonomous vehicle in the first parking spot; and
provide to the physically handicapped individual, a second set of instructions to move from the first set of location coordinates to the third set of location coordinates for rendezvousing with the autonomous vehicle at the first parking spot.

15. The computer system of claim 14, wherein the physically handicapped individual is a visually impaired individual who is on foot, wherein the third set of location coordinates is identified to be within walking distance of the first set of location coordinates, and wherein the second set of instructions comprises navigational guidance for the visually impaired individual to walk from the first set of location coordinates to the third set of location coordinates.

16. The computer system of claim 15, wherein the at least one memory and the at least one processor are contained in one of a smartphone or a portable computer carried by the visually impaired individual, and wherein the second set of instructions include audible instructions conveyed to the visually impaired individual by the one of the smartphone or the portable computer.

17. The computer system of claim 14, wherein the physically handicapped individual is seated in a wheelchair, and wherein the second set of instructions comprises navigational guidance for the physically handicapped individual to operate the wheelchair for moving from the first set of location coordinates to the third set of location coordinates.

18. The computer system of claim 14, wherein the computer-executable instructions further include:
receive, from the autonomous vehicle, an indication that the first parking spot is unavailable;
identify, a fourth set of location coordinates that correspond to an alternative parking spot for the autonomous vehicle; and
transmit, to the autonomous vehicle, a third set of instructions directing the autonomous vehicle to drive to the fourth set of location coordinates for parking the autonomous vehicle in the alternative parking spot.

19. The computer system of claim 18, wherein each of the first set of location coordinates, the second set of location coordinates, the third set of location coordinates, and the fourth set of location coordinates comprise global positioning system (GPS) coordinates.

20. The computer system of claim 18, wherein the computer-executable instructions further include:
determine, that each of the first parking spot and the alternative parking spot is a legally permitted parking spot.

* * * * *